United States Patent
Chien et al.

(10) Patent No.: US 10,429,725 B2
(45) Date of Patent: Oct. 1, 2019

(54) PRISMLESS, NON-TELECENTRIC PROJECTOR

(71) Applicant: QISDA CORPORATION, Taoyuan (TW)

(72) Inventors: Chih-Shiung Chien, Taoyuan (TW); Ming-Kuen Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/940,989

(22) Filed: Mar. 30, 2018

(65) Prior Publication Data
US 2018/0307127 A1    Oct. 25, 2018

(30) Foreign Application Priority Data
Apr. 20, 2017 (CN) .......................... 2017 1 0261773

(51) Int. Cl.
| G03B 21/00 | (2006.01) |
| G03B 21/20 | (2006.01) |
| H04N 9/31 | (2006.01) |
| G03B 21/28 | (2006.01) |
| G02B 27/09 | (2006.01) |

(52) U.S. Cl.
CPC ....... *G03B 21/008* (2013.01); *G02B 27/0955* (2013.01); *G03B 21/2093* (2013.01); *G03B 21/28* (2013.01)

(58) Field of Classification Search
CPC .... G03B 21/008; G03B 21/28; G03B 21/208; H04N 9/3102; H04N 9/3108; H04N 9/3111; H04N 9/3152
See application file for complete search history.

(56) References Cited

U.S. PATENT DOCUMENTS

| 2015/0177911 A1* | 6/2015 | Hsiao | G06F 3/0426 345/175 |
| 2015/0268545 A1* | 9/2015 | Baba | G03B 21/2066 353/99 |
| 2015/0370048 A1* | 12/2015 | Takano | G02B 13/006 359/443 |

FOREIGN PATENT DOCUMENTS

| CN | 101135831 A | 3/2008 |
| TW | 201608324 A | 3/2016 |

OTHER PUBLICATIONS

Chien, Chih Shiung; TW201608324A; Mar. 1, 2016; Machine translation in English (Year: 2016).*

* cited by examiner

*Primary Examiner* — Ryan D Howard

(57) ABSTRACT

The invention provides a projector with a biaxially-tilted (with a 17-degree tilting angle) digital micro mirror device (DMD) whose light source module and lens set deployment is improved so that the incident light provided by the light source module travels along a first light route and is enlarged by the lens set before traveling along a second light route and provided to the biaxially-tilted DMD. The projector features in that the first lens group is composed of two specific spherical lenses or one specific aspheric lens and the second lens group is composed of one aspheric lens. Therefore, the prismless, non-telecentric projector, without using any TIR prism, can be made with fewer components, lower cost, and enhanced efficiency.

15 Claims, 8 Drawing Sheets

PRISMLESS, NON-TELECENTRIC PROJECTOR

BACKGROUND OF THE INVENTION

1. Field of the Invention

The invention relates to a projector, and more particularly, to a prismless, non-telecentric projector.

2. Description of the Prior Art

A digital light processing (DLP) projector may be classified as the kind with a prism for total internal reflection (TIR) and as the kind without the prism. The kind without the TIR prism saves the cost of prism production and implementation, which is more advantageous and more efficient than the kind with one. Nonetheless, the light source, the light pipe, and the lens set preceding the digital micro mirror device (DMD) in a current projector need to be set with a particular incident angle when providing incident light, according to the design requirements of the uniaxially-tilted DMD, as shown in FIG. 9. FIG. 9 is a schematic diagram showing the component deployment of a projector 9 of prior art that contains a digital micro mirror device 90 (DMD), a prism set for total internal reflection 91 (TIR), a reflecting mirror 92, a lens set 93, and a light pipe 94. In the projector 9 of prior art, the light travels through the light pipe 94 and the lens set 93 and is then reflected by the reflecting mirror 92 into the TIR prism 91 before being converted by the DMD 90 into an imaging light, which is transmitted to the imaging lens and thereby projected to the screen at last. However, the physical constraints of the uniaxially-tilted DMD 90 of the projector 9 of prior art permit only the receipt of an incident light incident with an inclined angle. Therefore, the TIR prism 91 is required to incline with an angle (45 degrees for example) relative to the DMD 90, which is unfavorable to size reduction. In today's pursuit of minimizing the size of a projector, the overly large size of a projector 9 of prior art means inconvenience and a loss of product competitiveness. Also, due to the restrictions posed by the deployment of the lens set, a possible interference between the lens set and the imaging lens often causes problems in conventional prismless projectors.

SUMMARY OF THE INVENTION

To solve the above problem, the embodiment of the invention provides a prismless, non-telecentric projector that includes a light source module, a biaxially-tilted digital micro mirror device (DMD), an imaging lens, and a lens set for transmitting an incident light to the biaxially-tilted DMD. The light source module provides the incident light. The biaxially-tilted DMD receives and converts the incident light into an imaging light. The imaging lens receives and projects the imaging light. The lens set is disposed between the light source module and the biaxially-tilted DMD and is composed of a first lens group and a second lens group. An effective focal length ratio of the second lens group to the first lens group is greater than or equal to 1.4 and smaller than or equal to 1.8.

Another embodiment of the invention provides a prismless, non-telecentric projector that includes a light source module, a biaxially-tilted DMD, an imaging lens, and a lens set for transmitting an incident light to the biaxially-tilted DMD. The light source module provides the incident light. The biaxially-tilted DMD receives and converts the incident light into an imaging light. The imaging lens receives and projects the imaging light. The lens set is disposed between the light source module and the biaxially-tilted DMD and is composed of a first lens group and a second lens group. The first lens group consists of two spherical lenses.

Another embodiment of the invention provides a prismless, non-telecentric projector that includes a light source module, a biaxially-tilted DMD, an imaging lens, and a lens set for transmitting an incident light. The light source module provides the incident light. The biaxially-tilted DMD receives and converts the incident light into an imaging light. The imaging lens receives and projects the imaging light. The lens set is composed of a first lens group and a second lens group. The first lens group consists of an aspheric lens.

In the prismless, non-telecentric projector provided by the invention, the first lens group is disposed between the light source module and the biaxially-tilted DMD and the second lens group is disposed between the first lens group and the biaxially-tilted DMD.

In the prismless, non-telecentric projector provided by the invention, the second group lens set is further disposed between the biaxially-tilted DMD and the imaging lens.

In the prismless, non-telecentric projector provided by the invention, a gap between the two spherical lenses is greater than or equal to 5 mm and less than or equal to 15 mm.

In the prismless, non-telecentric projector provided by the invention, a refractive index of the aspheric lens of the first lens group is greater than or equal to 1.69 and less than or equal to 1.85.

In the prismless, non-telecentric projector provided by the invention, the second group lens is composed of an aspheric lens whose refractive index is greater than or equal to 1.48 and less than or equal to 1.75.

In the prismless, non-telecentric projector provided by the invention, any lens of the lens set has a central axis. The central axes deviate from one another.

In the prismless, non-telecentric projector provided by the invention, the first lens group is composed of an aspheric lens or two spherical lenses, which further reduces the component cost of the system and prevents a possible interference between the lens set and the imaging lens.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and claims, the system components are differentiated not by their names but by their function and structure differences. In the following discussion and claims, the terms "include" and "comprise" are used in an open-ended fashion and should be interpreted as "include but is not limited to". Also, the term "couple" or "link" is intended to mean either an indirect or a direct mechanical or electrical connection. Thus, if a first device is coupled or linked to a second device, that connection may be through a direct mechanical or electrical connection, or through an indirect mechanical or electrical connection via other devices and connections.

Figure 1:
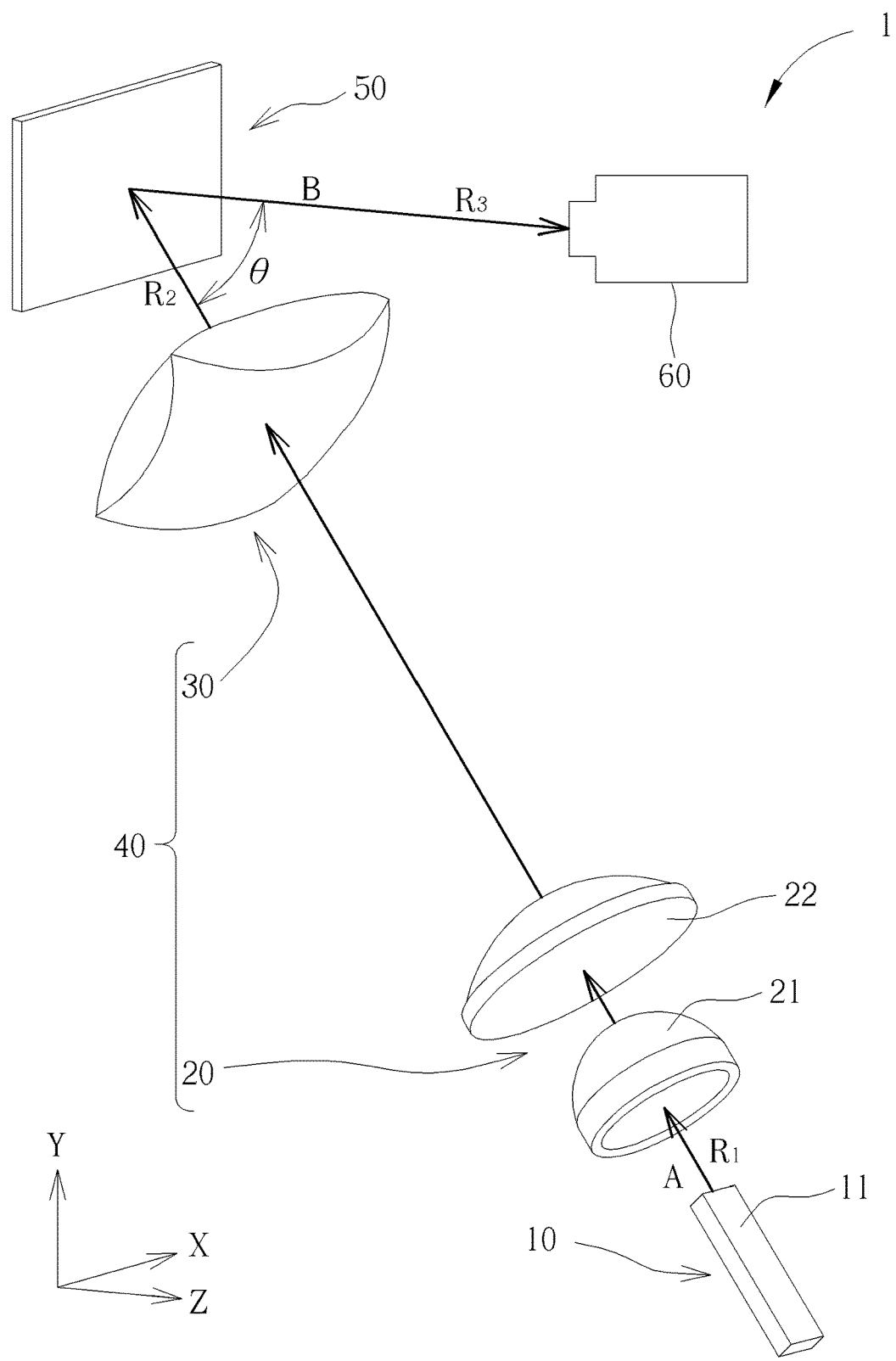
FIG. 1 and FIG. 2 are schematic diagrams at different view angles showing the component deployment of a first embodiment of the prismless, non-telecentric projector of the invention.
Figure 2:
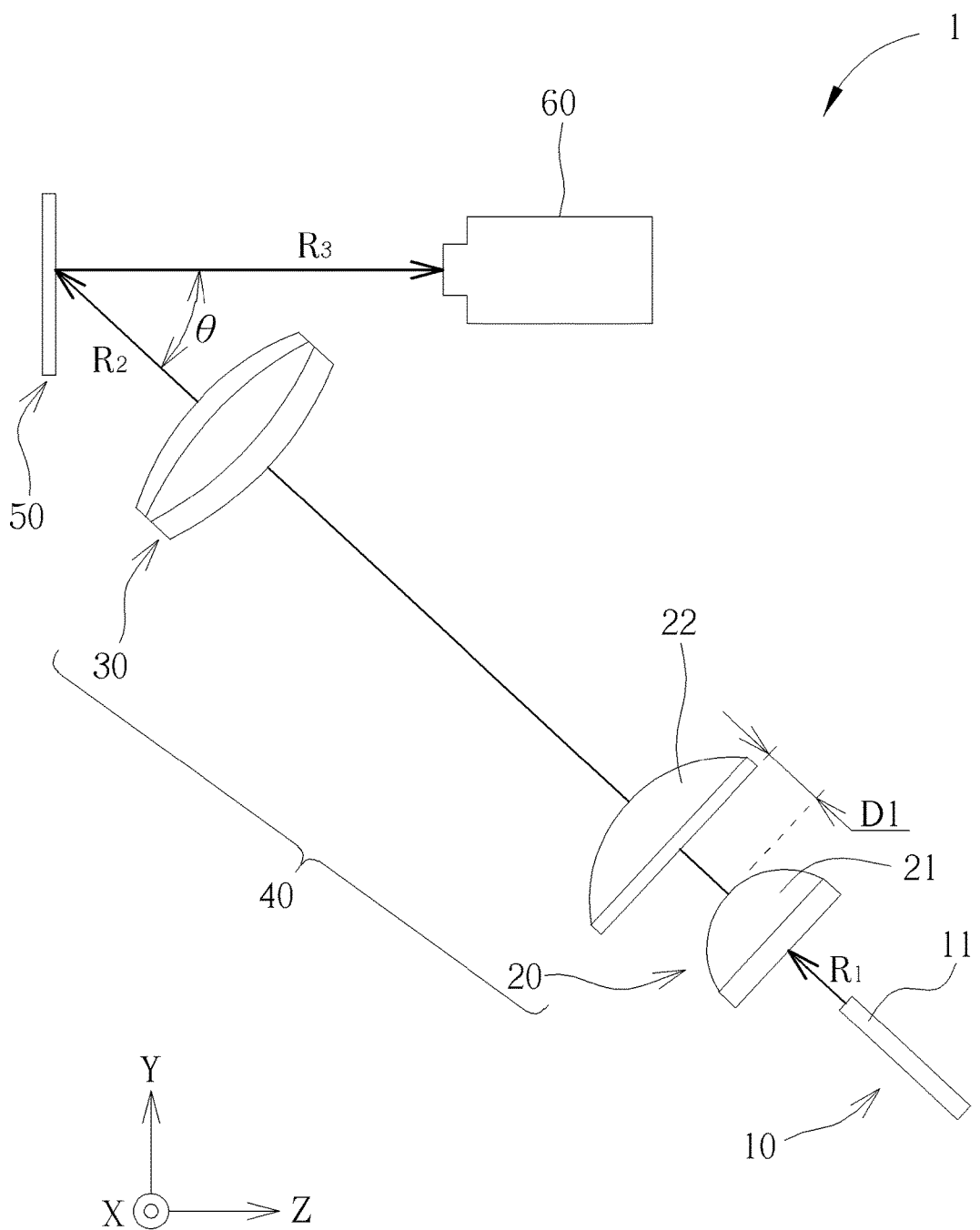
Figure 5:
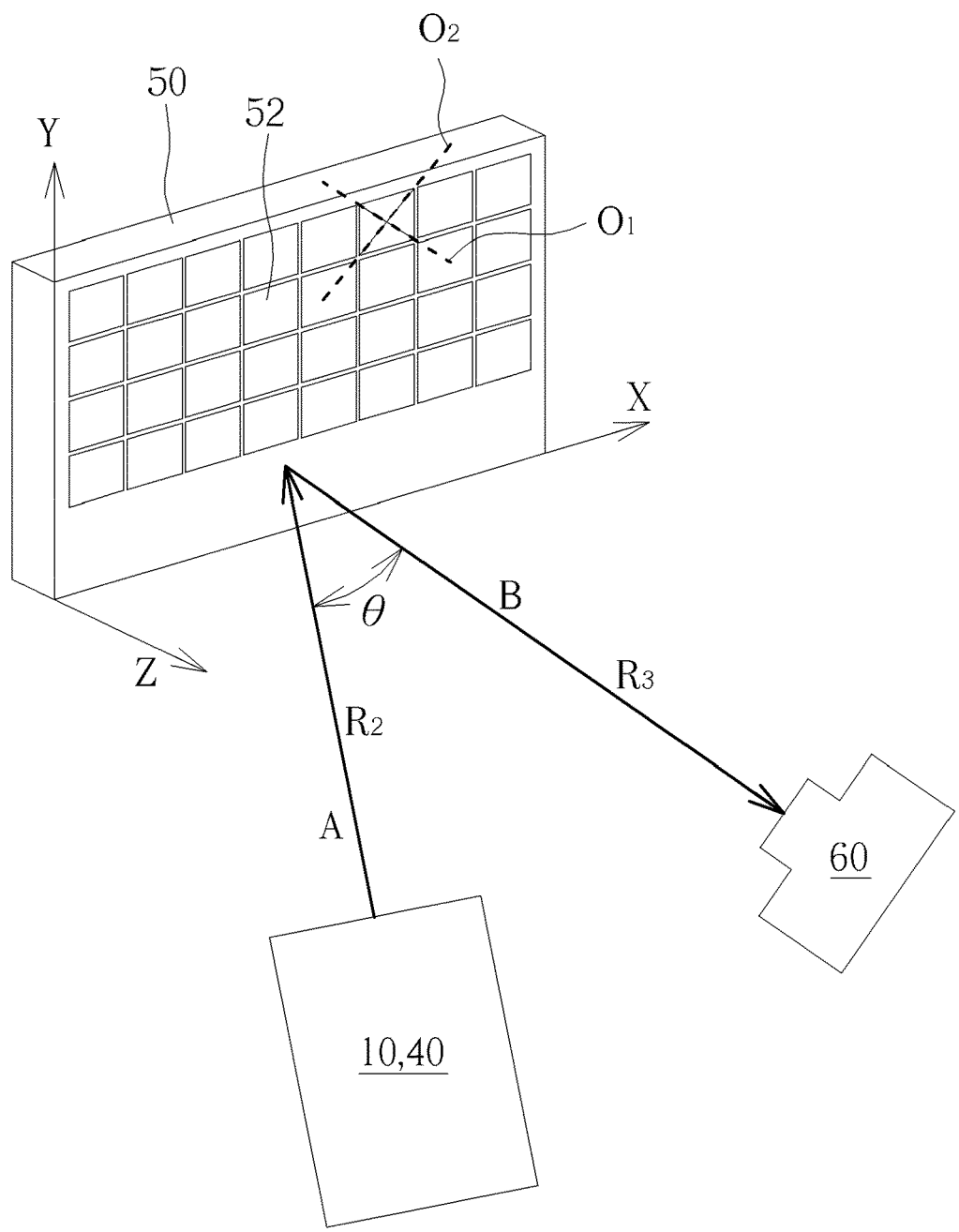
FIG. 5 is a schematic diagram showing the light route along which the incident light A is converted into the imaging light B by the biaxially-tilted DMD of the projector.

Please refer to FIG. 1 and FIG. 2. FIG. 1 and FIG. 2 are schematic diagrams at different view angles, showing the component deployment of a first embodiment for the prismless, non-telecentric projector of the invention. The projector 1 is a digital light processing (DLP) projector including a light source module 10, a lens set 40, a biaxially-tilted digital micro mirror device (DMD) 50, and an imaging lens 60, wherein the light source module 10 for emitting an incident light A and the lens set 40 form an illuminating unit of the projector 1. It should be noted that the biaxially-tilted DMD 50 is a TRP (Tilt & Roll Pixel) DLP® Pico™ chipset of TEXAS INSTRUMENTS Inc., which includes multiple micro mirrors (as shown in FIG. 5) for reflecting and converting the incident light A into the imaging light B. The lens set 40 is disposed between the light source module 10 and the biaxially-tilted DMD 50. The light source module 10 including a light source (not shown) and a light pipe 11 emits the incident light A to travel along a first light route R1 to the lens set 40, where the incident light A is enlarged and then travels along a second light route R2 to the biaxially-tilted DMD 50. The biaxially-tilted DMD 50 receives and converts (and reflects) the incident light A into the imaging light B that travels along a third light route R3 to the imaging lens 60, where the imaging light B is received and projected.

The lens set 40 of the invention is composed of a first lens group 20 and a second lens group 30. For a non-telecentric biaxially-tilted DMD, an effective focal length ratio of the second lens group 30 (the rear lens group of the illuminating unit) to the first lens group 20 (the front lens group of the illuminating unit), equivalent to the magnification of the lens set 40, is greater than or equal to 1.4 and less than or equal to 1.8, which is also equivalent to the ratio of the effective area of the biaxially-tilted DMD 50 (or the total area of the micro mirrors) to the area of the light emitting end of the light pipe 11. If the effective focal length ratio of the second lens group 30 to the first lens group 20 is greater than the upper bound mentioned above as 1.8, it is concluded that the area of the light emitting end of the light pipe 11 is too small and the light emitted from the light pipe 11 is too less, leading to an darker projection. If the effective focal length ratio of the second lens group 30 to the first lens group 20 is less than the lower bound mentioned above as 1.4, it is concluded that the area of the light emitting end of the light pipe 11 is too large, the light spot area formed after the incident light A passing through the lens set 40 overfills the effective area of the biaxially-tilted DMD 50 (or the total area of the micro mirrors) and the overfill loss (or the surplus of incident light A) is too much, giving rise to stray light that affects contrast in the projected image. Specifically, the first lens group 20 is disposed between the light source module 10 and the biaxially-tilted DMD 50 and the second lens group 30 is disposed between the first lens group 20 and the biaxially-tilted DMD 50. As shown in FIG. 1 and FIG. 2, the first lens group 20 is composed of a spherical lens 21 and a spherical lens 22, and a gap D1 between the spherical lens 21 and the spherical lens 22 is greater than or equal to 5 mm and less than or equal to 15 mm. The second lens group 30 is composed of one aspheric lens whose refractive index is greater than or equal to 1.48 and less than or equal to 1.75. Therefore, the cost of the projector 1 is reduced, while the image distortion and aberration are kept minor.

Figure 3:
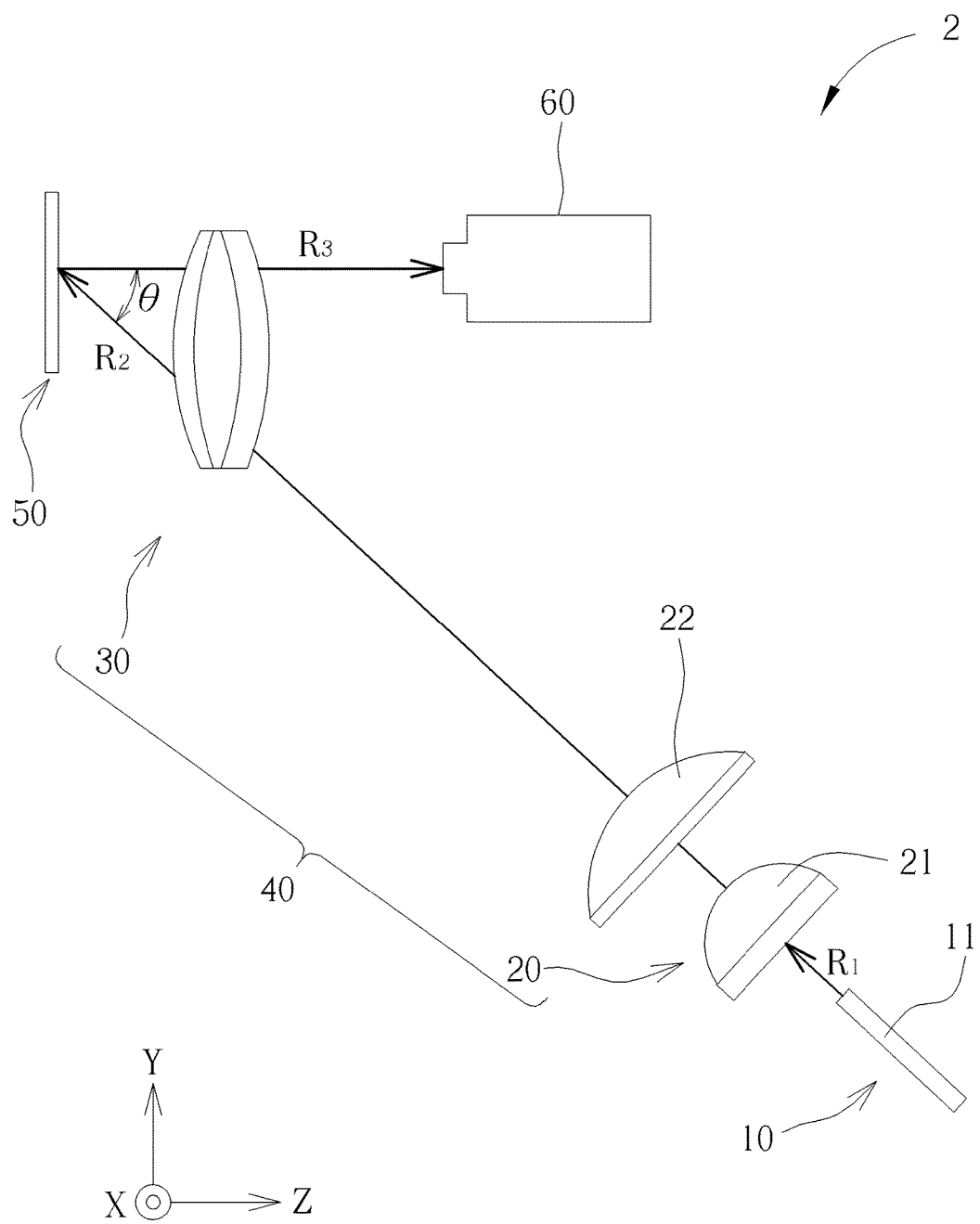
FIG. 3 is a schematic diagram showing the components of a second embodiment of the projector of the invention.

Please refer to FIG. 3. FIG. 3 is a schematic diagram showing the components of a second embodiment of the projector of the invention. For the second embodiment, the second lens group 30 (the rear lens group of the illuminating unit) is disposed not only between the first lens group 20 (the front lens group of the illuminating unit) and the biaxially-tilted DMD 50 but also between the biaxially-tilted DMD 50 and imaging lens 60, which prevents possible interference between the second lens group 30 and the imaging lens 60 and provides extra room for configuring a wider zoom in and out scale.

Figure 4:
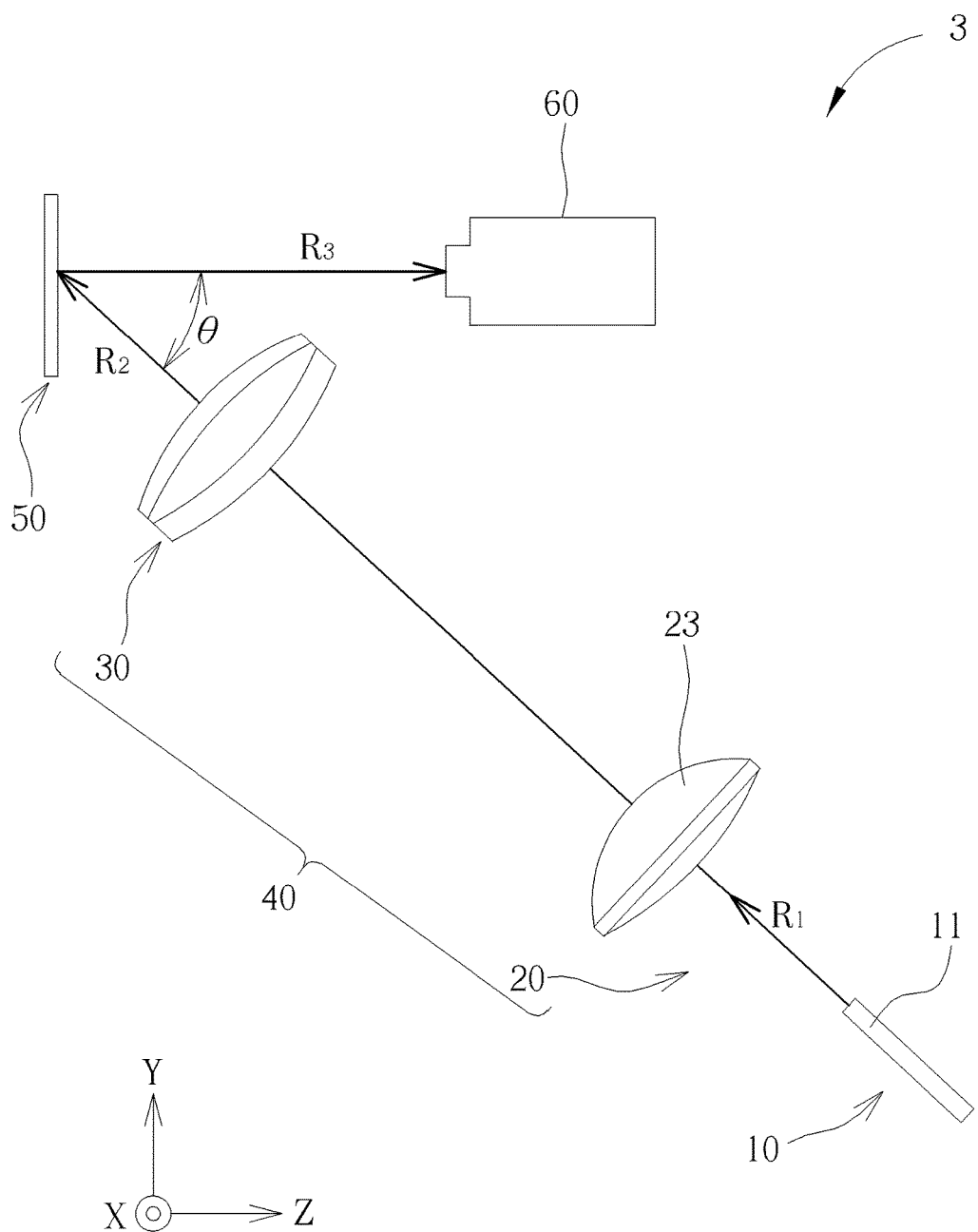
FIG. 4 is a schematic diagram showing the components of a third embodiment of the projector of the invention.

Please refer to FIG. 4. FIG. 4 is a schematic diagram showing the components of a third embodiment of the projector of the invention. The third embodiment differs from the first embodiment in that the first lens group 20 of the projector 3 consists of only one aspheric lens 23 whose refractive index is greater than or equal to 1.69 and less than or equal to 1.85 for improving aberration correction. That is, the spherical lens 21 and the spherical lens 22 of the first embodiment are replaced by a single aspheric lens 23 for the third embodiment, which also reduces the cost.

It should be noted that every lens in the illuminating unit of the projector of the invention is deployed off-axis, thereby deviating the central axes of the lenses with one another. That is, all the central axes of the lenses do not fall on a common light axis, which corrects image distortion, system aberration, and optical path-length differences between the lenses.

Please refer to FIG. 5. FIG. 5 is a schematic diagram showing the overall light route on which the incident light A is converted into the imaging light B by the biaxially-tilted DMD 50 of the projector 1. For the convenience of illustration, a horizontal side and a vertical side of the biaxially-tilted DMD 50 are defined as the substantially orthogonal X-axis and Y-axis respectively, and a direction oriented parallel to the third light route R3 (therefore substantially perpendicular to both the X-axis and the Y-axis) is defined as the Z-axis. The biaxially-tilted DMD 50 includes a plurality of square micro mirrors 52 arranged as an M-by-N matrix, wherein every micro mirror 52 may tilt along a first diagonal axis O1 with a particular angle (12 degrees for example) substantially and then tilt along a second diagonal axis O2 with a particular angle (12 degrees for example) substantially, which renders every micro mirror 52 tilted with a 17-degree angle relative to the X-Y plane substantially. Also, each of the first diagonal axis O1 and the second diagonal axis O2 forms a 45-degree angle with the X-axis (and with the Y-axis) substantially, and the first diagonal axis O1 and the second diagonal axis O2 are perpendicular to each other. Compared with the micro mirror that can only tilt for 12 degrees along a single diagonal axis, every micro mirror 52 of the biaxially-tilted DMD 50 tilts with a larger angle as the total area of the micro mirrors remains the same, which magnifies the Etendue (the area multiplied by the tilted angle) and enables more light to be gathered by the lens set 40 for transmittance.

The micro mirrors 52 of the biaxially-tilted DMD 50 of the invention are capable of tilting with a 17-degree angle, which enables the light source module 10 and the lens set 40 to be set under the horizontal side (the X-axis) of the biaxially-tilted DMD 50 when providing incident light A, in an inclined manner, to the biaxially-tilted DMD 50, without using a prism for total internal reflection (TIR) in the projector 1. Therefore, the objective of cost reduction and efficiency enhancement is achieved. Specifically, as shown in FIG. 2 and FIG. 5, after the incident light A travels along the second light route R2 from the light source module 10 to the biaxially-tilted DMD 50 through the lens set 40, the then derived imaging light B travels along the third light route R3 before incident into the imaging lens 60. It should be noted that the second light route R2 is substantially perpendicular to the X-axis and also forms an angle θ with the third light route R3. Preferably, considering the requirement of design for a non-telecentric projector (which requires the center of the imaging lens to be elevated from the center of the digital micro mirrors) and the tilting angle of the micro mirrors 52, the angle θ between the second light route R2 and the third light route R3 is substantially set between 36 and 40 degrees (or between 38.5 and 39.5 degrees, preferably), i.e., the lens set 40 is set under the horizontal side (the X-axis, the long side) of the biaxially-tilted DMD 50 and inclined between 36 and 40 degrees towards the biaxially-tilted DMD 50 when providing the incident light A, which prevents possible interference between the second lens group 30 and the imaging lens 60.

Figure 6:
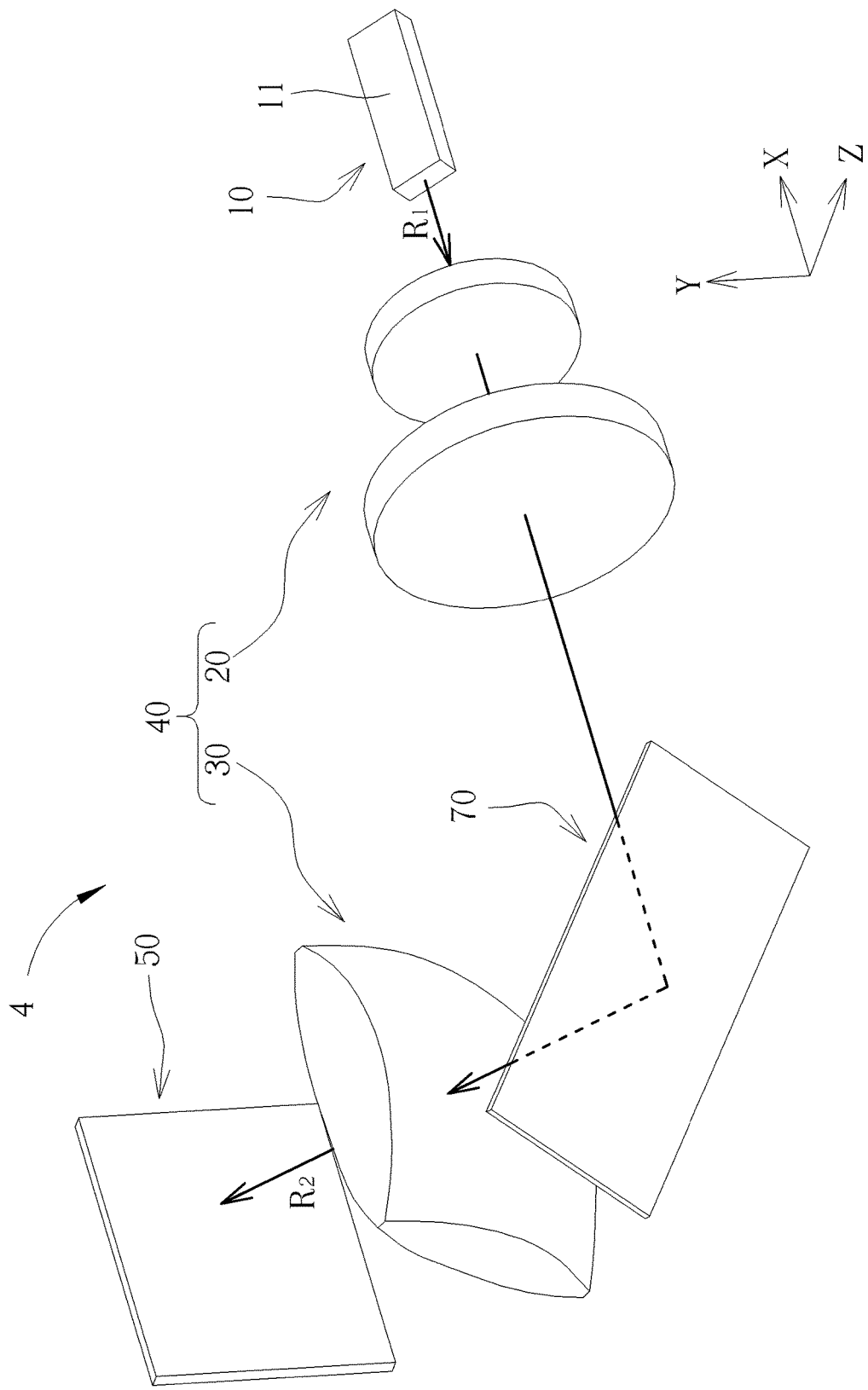
FIG. 6 and FIG. 7 are schematic diagrams at different view angles showing the component deployment of a fourth embodiment of the projector of the invention.
Figure 7:
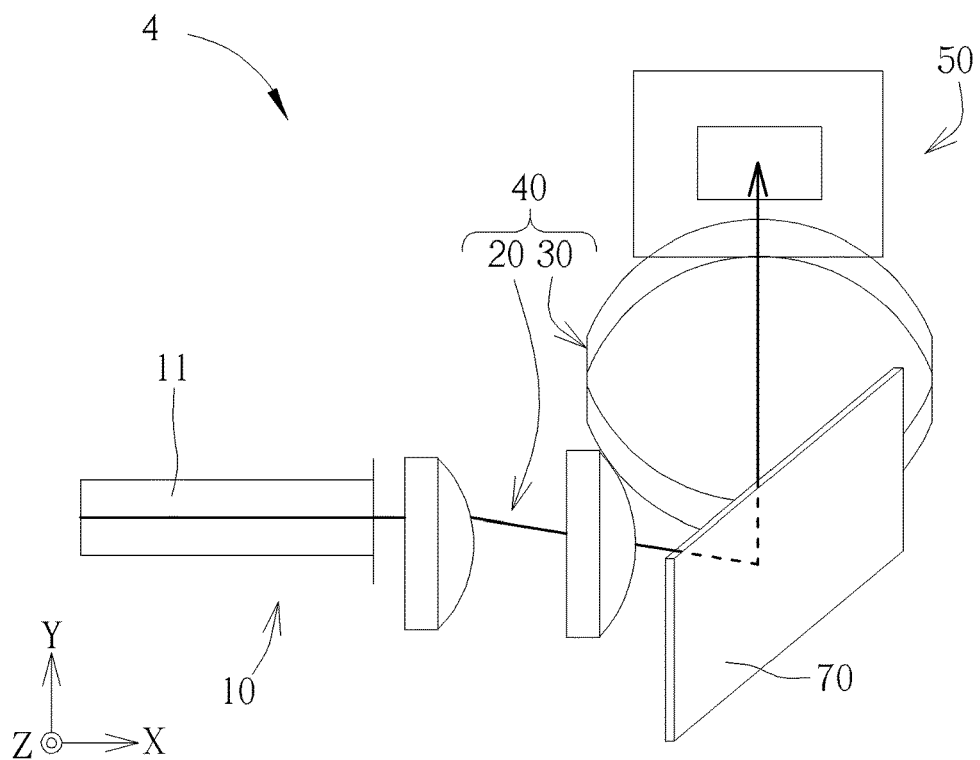
Figure 8:
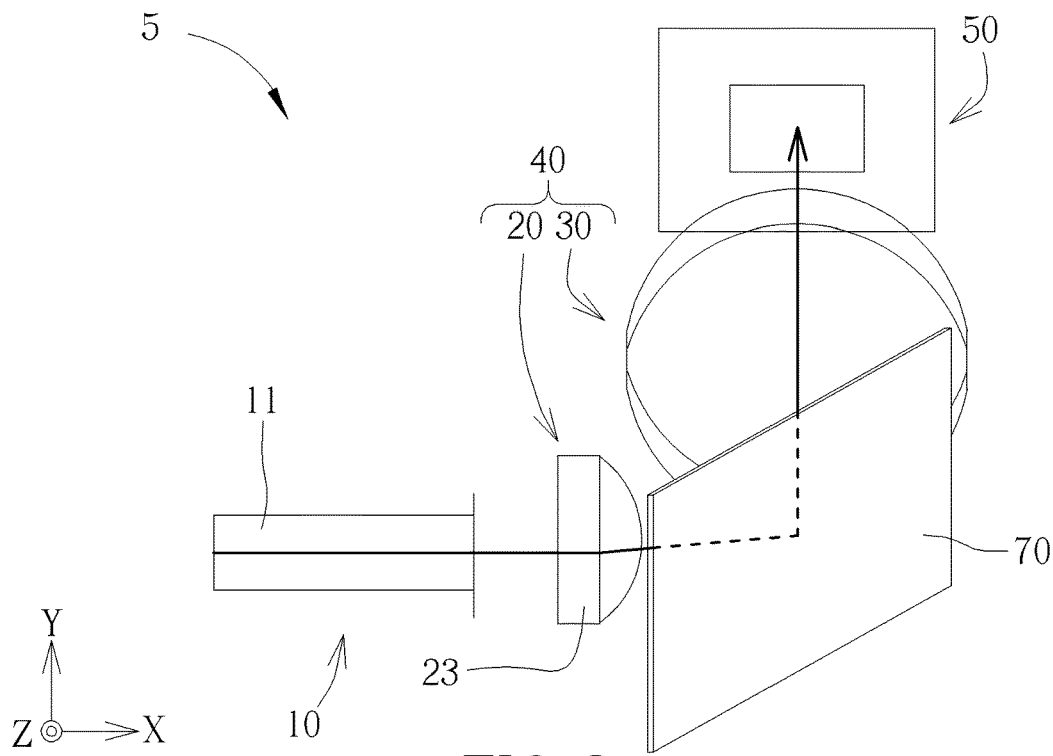
FIG. 8 is a schematic diagram showing a fifth embodiment of the invention.
Figure 9:
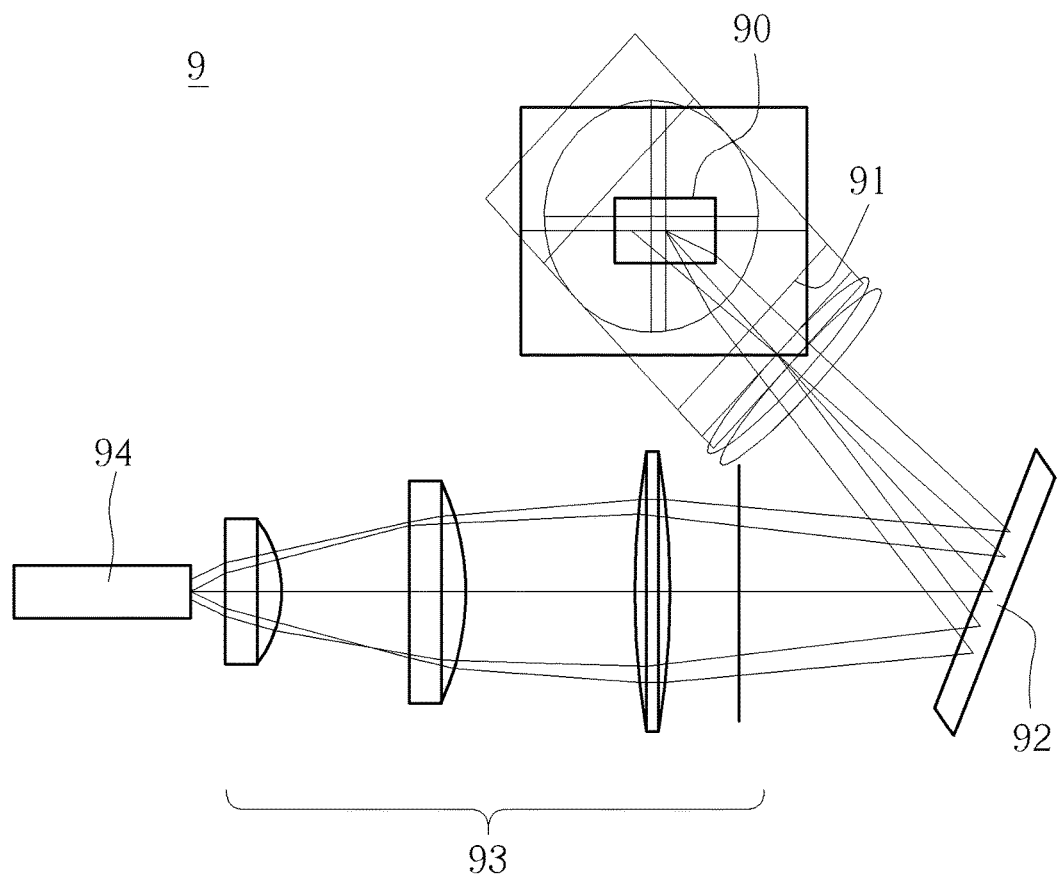
FIG. 9 is a schematic diagram showing the component deployment of a projector of prior art.

In the first embodiment shown in FIG. 1 and FIG. 2, the first lens group 20 and the second lens group 30 of the lens set 40 do not alter the direction in which the light travels therebetween, so the first light route R1 and the second light route R2 in the first embodiment are actually the same (that is, coaxial), which is not a necessary requirement to be posed to the invention. Please refer to FIG. 6 to FIG. 8. FIG. 6 and FIG. 7 are schematic diagrams at different view angles showing the component deployment of a fourth embodiment of the invention. FIG. 8 is a schematic diagram showing a fifth embodiment of the invention. In the fourth embodiment, the components same as those in the first embodiment are numbered in a same manner and for brevity cause, no further description for these components is provided here. The projector 4 of the fourth embodiment further include a reflecting mirror 70 disposed between the first lens group 20 (the front lens group of the illuminating unit) and the second lens group 30 (the rear lens group of the illuminating unit). The reflecting mirror 70 reflects the incident light A, emitted from the first lens group 20 and traveling along the first light route R1, toward the second lens group 30, where the second lens group 30 then transmits the incident light A along the second light route R2 to the biaxially-tilted DMD 50. Therefore, the light source module 10 and the first lens group 20 may be implemented at positions different from those in the first embodiment, which lessens the dimension of the projector 4 along a particular direction (X-axis for example) to further reduce the overall size of the projector 4 while maintaining the optical path-length between the first lens group 20 and second lens group 30. In the fourth embodiment, the reflecting mirror 70 forms a 45-degree angle with the first lens group 20 and with the second lens group 30 respectively, which means the first light route R1 and the second light route R2 are perpendicular to each other, while this is not a necessary requirement to be posed to the invention since the first light route R1 and the second light route R2 may form any angle via the tailored deployment of the reflecting mirror 70. As for the fifth embodiment of FIG. 8, the components same as those in the third embodiment of FIG. 4 are also numbered in a same manner and for brevity cause, no further description for these components is provided here. In the fifth embodiment, the illuminating unit also includes a reflecting mirror 70 disposed between the first lens group 20 (the front lens group of the illuminating unit) and the second lens group 30 (the rear lens group of the illuminating unit). The reflecting mirror 70 is implemented for the same reason of altering the light route of the incident light A to further reduce the overall size of the projector 5 while maintaining the optical path-length between the first lens group 20 and second lens group 30.

Through the tailored deployment of the light source module and the lens set according to the requirement of the biaxially-tilted DMD with a 17-degree tilting angle of the projector of the invention, the incident light emitted from the light source module travels along the first light route and is enlarged by the lens set before traveling along the second light route to the biaxially-tilted DMD. Also, a particularly specified spherical lens or aspheric lens is adopted as the first lens group, and a particularly specified aspheric lens is adopted as the second lens group. Therefore, the prismless, non-telecentric projector, without using any TIR prism, can be made with fewer components, lower cost, and enhanced efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A prismless, non-telecentric projector, comprising:
a light source module for providing an incident light;
a biaxially-tilted digital micro mirror device (DMD) for receiving and converting the incident light into an imaging light;
a lens set, disposed between the light source module and the biaxially-tilted DMD, for transmitting the incident light to the biaxially-tilted DMD, wherein the lens set is composed of a first lens group and a second lens group and an effective focal length ratio of the second lens group to the first lens group is greater than or equal to 1.4 and smaller than or equal to 1.8, wherein the first lens group is composed of two spherical lenses; and
an imaging lens for receiving and projecting the imaging light.

2. The projector of claim 1, wherein a gap between the two spherical lenses is greater than or equal to 5 mm and less than or equal to 15 mm.

3. The projector of claim 1, wherein the second lens group is composed of an aspheric lens whose refractive index is greater than or equal to 1.48 and less than or equal to 1.75.

4. The projector of claim 1, wherein the first lens group is disposed between the light source module and the biaxially-tilted DMD and the second lens group is disposed between the first lens group and the biaxially-tilted DMD.

5. The projector of claim 4, wherein the second lens group is further disposed between the biaxially-tilted DMD and the imaging lens.

6. The projector of claim 1, wherein each lens of the lens set has a central axis, the central axes deviating from one another.

7. A prismless, non-telecentric projector, comprising:
a light source module for providing an incident light;
a biaxially-tilted digital micro mirror device (DMD) for receiving and converting the incident light into an imaging light;
a lens set, disposed between the light source module and the biaxially-tilted DMD, for transmitting the incident light to the biaxially-tilted DMD, wherein the lens set is composed of a first lens group and a second lens group, the first lens group composed of two spherical lenses, the second lens group composed of an aspheric lens whose refractive index is greater than or equal to 1.48 and less than or equal to 1.75; and
an imaging lens for receiving and projecting the imaging light.

8. The projector of claim 7, wherein a gap between the two spherical lenses is greater than or equal to 5 mm and less than or equal to 15 mm.

9. The projector of claim 7, wherein the first lens group is disposed between the light source module and the biaxially-tilted DMD and the second lens group is disposed between the first lens group and the biaxially-tilted DMD.

10. The projector of claim 9, wherein the second lens group is further disposed between the biaxially-tilted DMD and the imaging lens.

11. The projector of claim 7, wherein each lens of the lens set has a central axis, the central axes deviating from one another.

12. A prismless, non-telecentric projector, comprising:
a light source module for providing an incident light;
a biaxially-tilted digital micro mirror device (DMD) for receiving and converting the incident light into an imaging light;
a lens set for transmitting the incident light, wherein the lens set comprises a first lens group and a second lens group, the first lens group composed of an aspheric lens, the second lens group composed of an aspheric lens whose refractive index is greater than or equal to 1.48 and less than or equal to 1.75; and
an imaging lens for receiving and projecting the imaging light.

13. The projector of claim 12, wherein a refractive index of the aspheric lens of the first lens group is greater than or equal to 1.69 and less than or equal to 1.85.

14. The projector of claim 12, wherein the first lens group is disposed between the light source module and the biaxially-tilted DMD and the second lens group is disposed between the first lens group and the biaxially-tilted DMD.

15. The projector of claim 14, wherein the second lens group is further disposed between the biaxially-tilted DMD the imaging lens.

* * * * *